US008341100B2

(12) United States Patent
Miller et al.

(10) Patent No.: US 8,341,100 B2
(45) Date of Patent: Dec. 25, 2012

(54) EPITHELIAL LAYER DETECTOR AND RELATED METHODS

(75) Inventors: Matthew L. Miller, Princeton, NJ (US); Christopher Malon, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 672 days.

(21) Appl. No.: 12/496,802

(22) Filed: Jul. 2, 2009

(65) Prior Publication Data
US 2010/0004915 A1    Jan. 7, 2010

Related U.S. Application Data

(60) Provisional application No. 61/077,974, filed on Jul. 3, 2008.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ........................................................ 706/15

(58) Field of Classification Search ............... 706/15, 706/20, 62
See application file for complete search history.

(56) References Cited

U.S. PATENT DOCUMENTS

| 5,010,814 A | * | 4/1991 | Shishikura | 101/211 |
| 5,633,990 A | * | 5/1997 | Housel | 358/1.9 |
| 6,463,425 B2 | * | 10/2002 | Raz | 706/20 |

FOREIGN PATENT DOCUMENTS
WO    WO 2005/119589 A1 * 12/2005

OTHER PUBLICATIONS

Ramírez-Niño, "Image Processing and Neural Networks for Early Detection of Histological Changes", MICAI 2004, LNAI 2972, pp. 632-641, 2004.*
Matsugu et al, "Unsupervised Feature Selection for Multi-class Object Detection Using Convolutional Neural Networks", ISNN 2004, LNCS 3173, pp. 864-869, 2004.*
Hansen et al, "Wound Status Evaluation Using Color Image Processing", IEEE Transactions on Medical Imaging, vol. 16, No. 1, Feb. 1997.*
Korekado et al, "A Convolutional Neural Network VLSI for Image Recognition Using Merged/Mixed Analog-Digital Architecture", KES 2003, LNAI 2774, pp. 169-176, 2003.*

* cited by examiner

*Primary Examiner* — David R Vincent
*Assistant Examiner* — Ilya Traktovenko
(74) *Attorney, Agent, or Firm* — Paul Schwarz; Joseph Kolodka

(57) ABSTRACT

An epithelial detector and method for automatically identifying epithelial portions of a tissue sample, includes: staining the tissue sample with at least two dyes; applying a color transformation to a color image of the tissue sample to obtain one or more color channels; and applying a trained convolutional neural network to the color channels to obtain a decision for position in the tissue as to whether it is inside or outside an epithelial layer. Also, a method for training the convolutional neural network.

7 Claims, 6 Drawing Sheets

EPITHELIAL LAYER DETECTOR AND RELATED METHODS

RELATED APPLICATIONS

This application claims the benefit of U.S. Provisional Application No. 61/077,974, filed Jul. 3, 2008, the entire disclosure of which is incorporated herein by reference.

This application is related to U.S. patent application Ser. No. 12/496,795 filed Jul. 2, 2009, entitled Signet Ring Cell Detector and Related Methods, which claims the benefit of U.S. Provisional Application No. 61/077,969, filed Jul. 3, 2008, and U.S. patent application Ser. No. 12/496,785 filed Jul. 2, 2009 entitled Mitotic Figure Detector And Counter System And Method For Detecting And Counting Mitotic Figures, which claims the benefit of U.S. Provisional Application No. 61/077,966, filed Jul. 3, 2008. The entire disclosures of U.S. patent application Ser. No. 12/496,795 filed Jul. 2, 2009, entitled Signet Ring Cell Detector and Related Methods, and U.S. patent application Ser. No. 12/496,785 filed Jul. 2, 2009 entitled Mitotic Figure Detector And Counter System And Method For Detecting And Counting Mitotic Figures, are incorporated herein by reference.

FIELD

The present disclosure relates to digital pathology. More particularly, the present disclosure relates to a epithelial layer detector and corresponding method for automatically identifying epithelial portions of a tissue sample.

BACKGROUND OF THE INVENTION

Digital pathology involves the use of computers to assist pathologists in grading tissue specimens. For example, a tissue sample for breast carcinoma diagnosis typically takes an expert five minutes or more to grade. Several studies have demonstrated low agreement among pathologists' grading of the same case, questioning the objectivity of their diagnosis. A successful system may assist the pathologist in diagnosis, helping to achieve more reproducible results at lower cost.

The identification of epithelial tissue is important for diagnosis of breast and gastric cancer, because cell nuclei density around the epithelium reaches high levels, which trigger a false alarm for malignancy. These areas must be ruled out from nuclei density estimates in order to produce histological statistics of diagnostic value.

In the case of breast and gastric cancer, a tissue sample may be taken from a patient, sliced, stained with hematoxylin and eosin dyes, and imaged by a digital scanner with microscopic resolution. The problem is to distinguish the portions of the tissue that lie within epithelial layers from those that do not.

The prior art has addressed the problem of distinguishing portions of tissue in a couple of methods. In one method, a linear classifier (trained with a linear neural network), is used to classify each pixel of the scanned image into one of four tissue categories according to its color. Then hand-designed heuristics are used to find the boundaries of the epithelium. In another method, color segmentation is first applied to the image. Each segment is then classified as one of several different objects according to hand-designed heuristics based on its color, some basic shape features, and the earlier classification of nearby segments. One of the classes available is "epithelial nuclei", which are defined as segments that have a hematoxylin color and are neither round enough to look like "stromal nuclei" nor large and dark enough to look like "apoptotic nuclei".

Unfortunately, the above methods have limited flexibility. The methods based on hand-designed heuristics, require a new set of rules to be designed for each pattern that is to be recognized. In addition, the color segmentation method can only recognize nuclear material as part of the epithelial layer. It cannot recognize other materials, such as the mucinous cell bodies of goblet cells, that should be properly regarded as part of the epithelial layer.

Accordingly, an improved and more flexible apparatus/method is needed for automatically distinguishing the portions of the tissue that lie within epithelial layers from those that do not.

SUMMARY OF INVENTION

A method for automatically identifying epithelial portions of a tissue sample. The method comprises: staining the tissue sample with one or more dyes; applying a color transformation computer process to separate color images of the dyed tissue sample into one or more color channels; and applying a convolutional neural network computer process to the color channels to obtain a decision for each position in the tissue sample, as to whether it is inside or outside an epithelial layer.

Further disclosed herein is a method for automatically identifying epithelial portions of a tissue sample. The method comprises: staining the tissue sample with at least two dyes; applying a color transformation computer process to a color image of the tissue sample to obtain at least two separate color tissue images formed by a plurality of pixels, each of the pixels of each of the color tissue images having an intensity indicating the estimated density of a corresponding dye at the corresponding pixel in the image; and applying a convolutional neural network computer process to the color tissue images to obtain a decision for a group of the pixels as to whether a center of the group is inside or outside an epithelial layer.

Also disclosed herein is a method for training one or more parameters of a convolutional neural network computer process of an epithelial layer detector used for identifying epithelial portions of a tissue sample. The method comprises: staining one or more tissue samples with at least two dyes; scanning the one or more tissue samples to produce color images of the one or more tissue samples; creating a set of masks each of which indicates for each pixel of a corresponding one of the images whether that pixel is inside or outside of an epithelial layer; applying a color transformation computer process to each of the images of the tissue samples to separate the images into color channels, each of the pixels of each of the color channels having an intensity indicating the estimated density of a corresponding dye at the corresponding pixel in the scan; selecting a set of patches from the groups of the separate color tissue images to use as training data, each patch including a contiguous collection of pixels from all the color tissue images in the group, some patches being centered inside epithelial layers and others being centered outside epithelial layers; initializing the parameters for the convolutional neural network computer process to arbitrary values; iteratively applying the convolutional neural network computer process to the set of patches; and adjusting the parameters to improve the match between a prediction of the convolutional neural network computer process and a correct label for each of the patches.

Further disclosed herein is an epithelial layer detector for automatically identifying epithelial portions of a tissue sample. The detector comprises: a color transform unit for applying a color transformation process to a color scan of the tissue sample stained with one or more dyes, to separate the images into color channels, each of the pixels of each of the color channels having an intensity indicating the estimated density of a corresponding dye at the corresponding pixel in the scan; and a convolutional neural network unit for applying a convolutional neural network process to the color channels to obtain a decision for each position in the tissue as to whether it is inside or outside an epithelial layer.

DETAILED DESCRIPTION

Disclosed herein is an epithelial detector and method that uses a convolutional neural network for automatically identifying epithelial portions of a tissue sample. Also disclosed herein is a method for training the convolutional neural network to identify the epithelial portions of tissue sample. The convolutional neural network includes of a series of convolutions, non-linear transfer functions, and subsamplings, each governed by a set of weights. The weights are trained using stochastic gradient descent to obtain good results on a collection of hand-labeled biopsy images.

Figure 1:
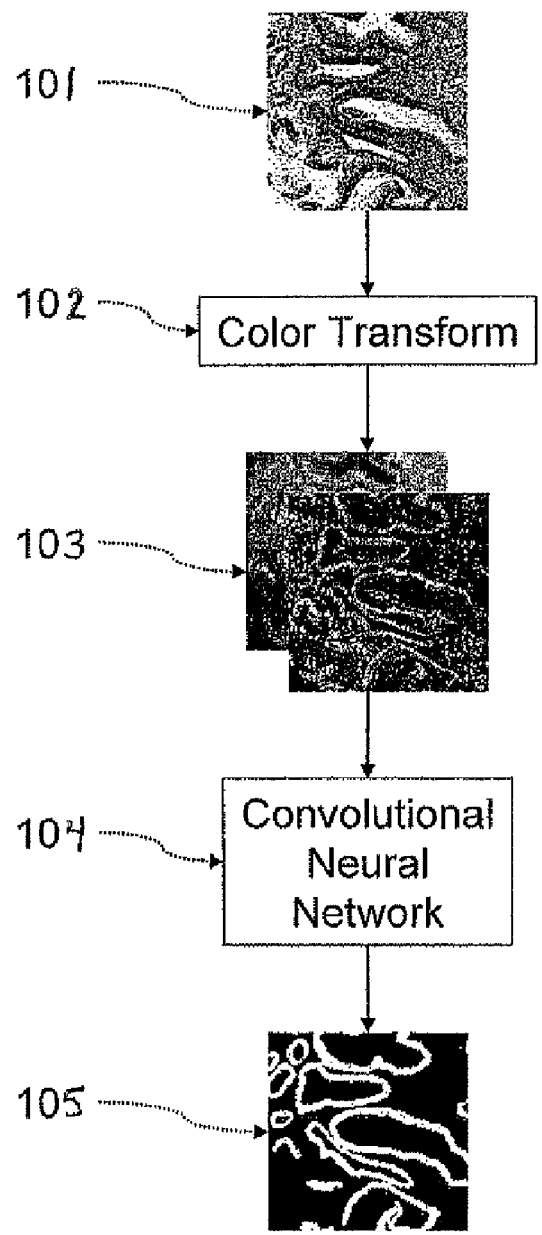
FIG. 1 is a functional block diagram of an exemplary embodiment of an epithelial detector for identifying epithelial portions of a tissue sample.

FIG. 1 is a functional block diagram of an exemplary embodiment of an epithelial detector 100 for automatically identifying epithelial portions of a tissue sample. The tissue sample may be prepared by staining it with multiple dyes, each of a different color, and then, an imaging device may be used for obtaining one or more digital high-resolution color scans or images 101 of the tissue sample. The high-resolution color scan(s) or image(s) 101 of the tissue sample is applied to an input of a color transformer 102. The color transformer 102 performs a color transformation process on each pixel of the scan or image in order to estimate the density of each dye at that pixel's location. The color transformation process produces a set of dye channels 103, one for each dye, as an output of color transformer 102, in which the intensity of each pixel indicates the estimated density of the dye. For more details about such a color transformation process, see for example, U.S. application Ser. No. 12/131,346 filed Jun. 2, 2008. The disclosure of U.S. application Ser. No. 12/131,346, as it relates to the color transformation process, is incorporated herein by reference. In another non-limiting embodiment, a simple separation into red, green, and blue color channels (performed by a color separator) may be applied in place of the separation into dye channels performed by the color transformer 102.

In one exemplary embodiment, the color transformer 102 estimates a dominant color for each of the dyes, as a vector in three-dimensional color space. Then, the density of each dye in a pixel is estimated by computing the correlation between the pixel's color and the dominant dye colors.

The tissue sample, in one exemplary embodiment, may have been stained with two dyes: hematoxylin, which typically images with a dark cyan color, and eosin, which typically images with a light magenta color. The age of the sample, the overall dye density, and various characteristics of the imaging device may, however, lead to variation in the exact hues of the dyes. Consequently, it cannot be assumed that the dyes will have the same color in every image. Hence, in this embodiment, the basic cyan color in the image is estimated as a weighted average of all the pixels, with the weight of each pixel based on its cyan content:

$$C = \frac{\sum_i w_i P_i}{\sum_i w_i} \quad w_i = \left(P_i^{Cyan}\right)^4,$$

where C is a basic cyan color, $P_i$ is the three-component color for pixel i, wi is a weight for pixel i, and $P_i^{Cyan}$ is pixel i's cyan value in cyan-magenta-yellow (CMY) color space. The basic magenta color M is then computed as another weighted average, where this time the weights are computed from the magnitude of each color vector that is not explained by the basic cyan color (the use of these weights is based on the assumption that the images are predominantly composed of cyan and magenta):

$$M = \frac{\sum_i w_i P_i}{\sum_i w_i} \quad w_i = \left|P_i - \frac{(P_i \cdot C)}{|C|^2}\right|^4.$$

Then, it is assumed that where a pixel is predominantly hematoxylin, it has little eosin, and vice-versa, so the dominant color for hematoxylin H is estimated by removing any basic magenta M contribution in the basic cyan C color, and the dominant color for eosin is estimated by removing any basic cyan C contribution in the basic magenta M color:

$$H = C - \frac{(C \cdot M)M}{|M|^2}$$

$$E = M - \frac{(M \cdot C)C}{|C|^2}.$$

The estimated density of hematoxylin H in pixel i is then $P_i \cdot H$, and the estimated density of eosin E is $P_i \cdot E$.

In an alternative embodiment, the color transformer performs a color transformation process on the scan(s) or image(s) using fixed vectors for the hematoxylin H dye and the eosin E dye. This embodiment of the color transformation process is appropriate if a great deal of color variation is not expected between images. The vectors in three-dimensional color space for hematoxylin H dye and eosin E dye may be selected by applying the above computation to several sample images and averaging together the results.

Referring still to FIG. 1, the set of dye channels 103, are applied to an input of a convolutional neural network (CNN) 104 that determines whether portions of the tissue are inside or outside epithelial layers. A CNN typically proceeds by applying a succession of convolutions, non-linear transfer functions, and subsamplings to its inputs, using trained values for convolution kernels, to obtain an array of outputs 105 describing some characteristic of the inputs. In the epithelial detector 100, the inputs 103 are the dye-density images, and the outputs 105 are indicators which indicate whether or not corresponding portions of the tissue are inside or outside epithelial layers.

Figure 2:
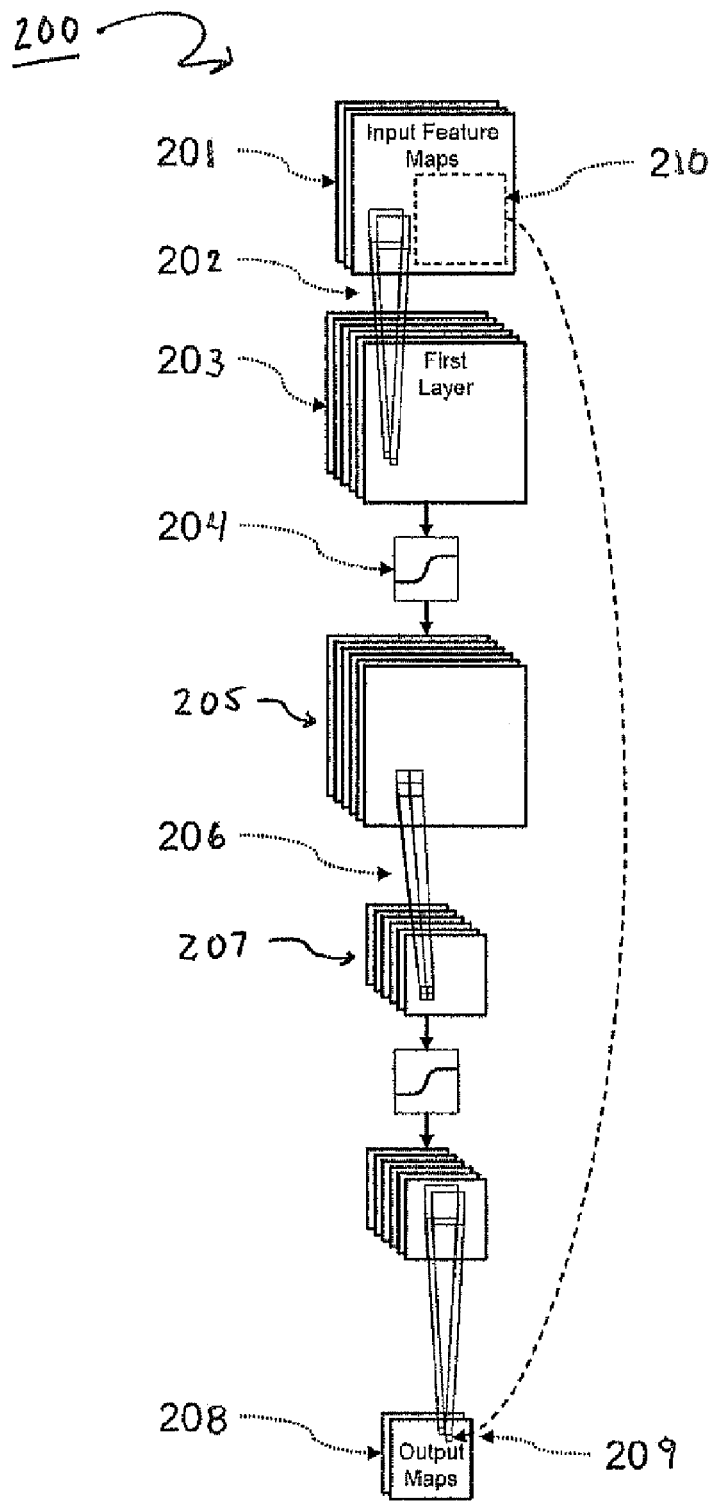
FIG. 2 schematically illustrates a conventional CNN.

FIG. 2 schematically depicts a conventional CNN 200. The structure and function of CNN 200 is well known in the art. The CNN convolves a stack of inputs 201 (input layer), referred to as feature maps, with small filters 202 to obtain a new stack of feature maps, referred to as an internal layer or first internal layer 203. Each of the feature maps in this first internal layer 203 is obtained by convolving one or more of the input maps with trained kernels (usually having different weights), and adding together the results. The resulting values are then passed through a non-linear transfer function 204 to obtain second internal layer 205. A third internal layer 207 is obtained by subsampling 206, wherein each value is obtained by averaging together a group of adjacent values from the previous internal layer (e.g., second internal layer 205). The groups do not overlap, so the resulting internal layer is substantially smaller than the previous internal layer. After several internal layers, it is clear that each value 209 in output layer 208 depends on an input window 210 of adjacent values in the input layer 201. Furthermore, these windows overlap with one another.

Figure 3:
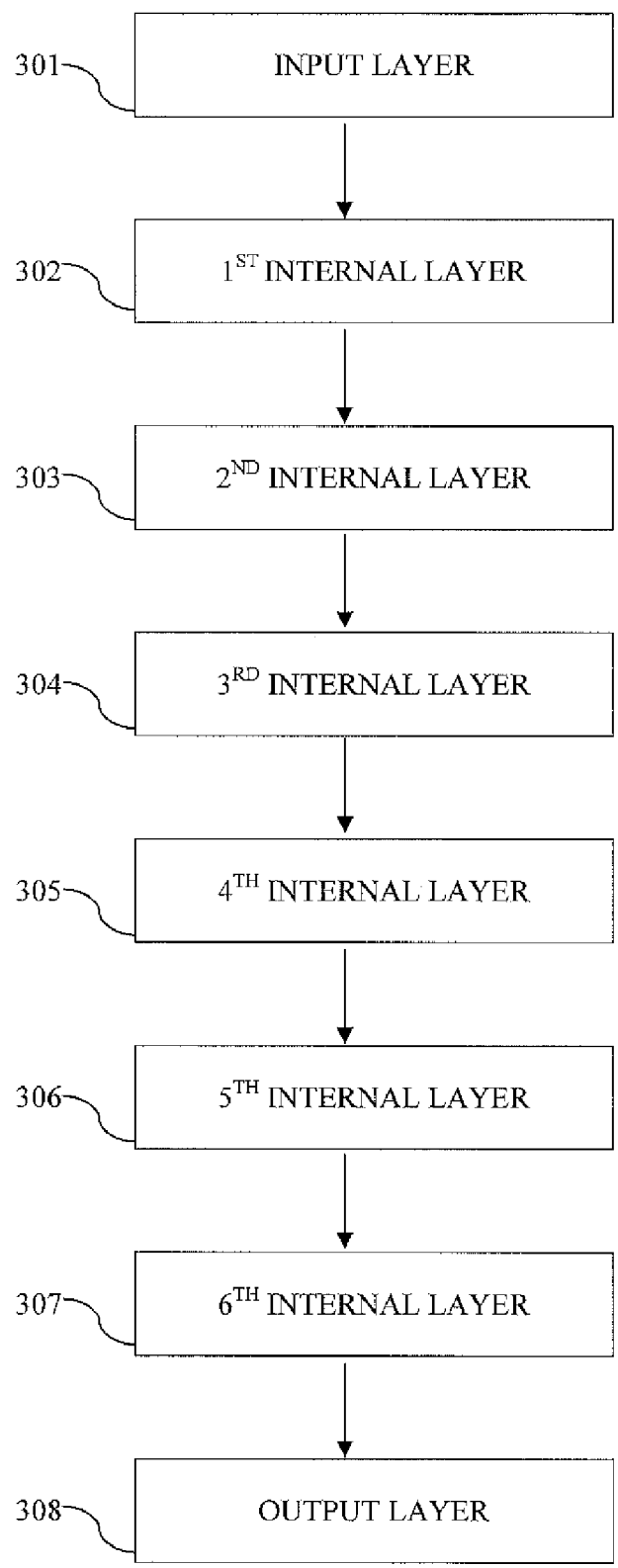
FIG. 3 schematically illustrates an exemplary embodiment of a CNN of the epithelial detector.

The CNN 104 used in the epithelial detector 100 of FIG. 1 is configured so that each value in the output layer of the CNN 104 indicates whether or not the center of an input window is inside an epithelial layer. FIG. 3 schematically depicts an exemplary embodiment of the CNN 104 of the epithelial detector 100. The CNN 104 includes an input layer 301, first, second, third, fourth, fifth, and sixth internal layers 302, 303, 304, 305, 306, and 307, respectively, and an output layer 308.

The input layer 301 includes two (2) feature maps. One of the two feature maps estimates hematoxylin density and the other one of the two feature maps estimates eosin density.

The first internal layer 302 includes nine (9) feature maps, which are obtained by convolving the two input feature maps with 5×5 kernels, adding a constant offset, and computing a hyperbolic tangent of the result. The values of the kernels and the constant offsets are obtained by a training process to be described further on. Because there are 9 feature maps in the first internal layer 302, there are 18 kernels and 9 constant offsets that must be trained. Because of the 5×5 convolution, each of the 9 feature maps in the first internal layer 302 is 4 pixels smaller in both x and y than each of the two feature maps in the input layer 301.

The second internal layer 303 is obtained by subsampling. Every 2×2 group of values in each of the 9 feature maps outputted from the first internal layer 302 is averaged together, multiplied by a constant, offset by another constant, and passed through the hyperbolic tangent function. This is performed separately for each of the 9 feature maps at the output of the first internal layer 302. Accordingly, the second internal layer 303 includes 9 feature maps each of which is computed from one of the 9 feature maps at the output of the first internal layer 302. The corresponding 9 multipliers and 9 offsets are obtained by training. Each of the 9 feature maps in the second internal layer 303 is half the width and half the height of their corresponding 9 feature maps in the first internal layer 302.

The third internal layer 304 has sixteen (16) feature maps, which are obtained by convolution with 5×5 kernels, offsetting with constants, and passing the result through the hyperbolic tangent function, in the same manner as described with respect to the first internal layer 302. Each of the 16 feature maps is computed from the 9 feature maps outputted from the second internal layer 303, therefore, there are 144 kernels to be trained.

The fourth internal layer 305 is computed by subsampling in the same manner as described with respect to the second internal layer 303. Therefore, the fourth internal layer includes 16 feature maps, each of which is obtained from one of the 16 feature maps at the output of the third internal layer 304.

The fifth layer 306 includes 32 feature maps, which are obtained by convolution with 5×5 kernels, offsetting with constants, and passing the result through the hyperbolic tangent function, in the same manner as described with respect to the first internal layer 302. Because each of the 32 feature maps is computed from the 16 feature maps at the output of the fourth internal layer 305, there are 512 kernels to be trained.

The sixth internal layer 307 includes 64 feature maps obtained by convolution with 5×5 kernels, offsetting with constants, and passing the result through the hyperbolic tangent function, in the same manner as the first internal layer 302. Because each of the 64 feature maps is computed from the 32 feature maps at the output of the fifth internal layer 307, there are 2048 kernels to be trained.

The output layer 308 includes 2 feature maps. One of these 2 output layer feature maps is trained to have a large value when a center of an input window of adjacent values in one of the 2 feature maps of the input layer 301 is inside an epithelial layer, and the other one of the 2 output layer feature maps is trained to have a large value when a center of an input window of adjacent values in one of the 2 feature maps of the input layer 301 is not inside an epithelial layer. The 2 output layer feature maps are obtained by convolution with 1×1 kernels, so that each output of the output layer 308 is just a weighted sum of corresponding values in all the 64 feature maps at the output of the sixth internal layer 307, with the weights obtained by training. With this architecture, each output value depends on a 48×48 window. The windows overlap by 44 pixels in x and y.

Figure 4:
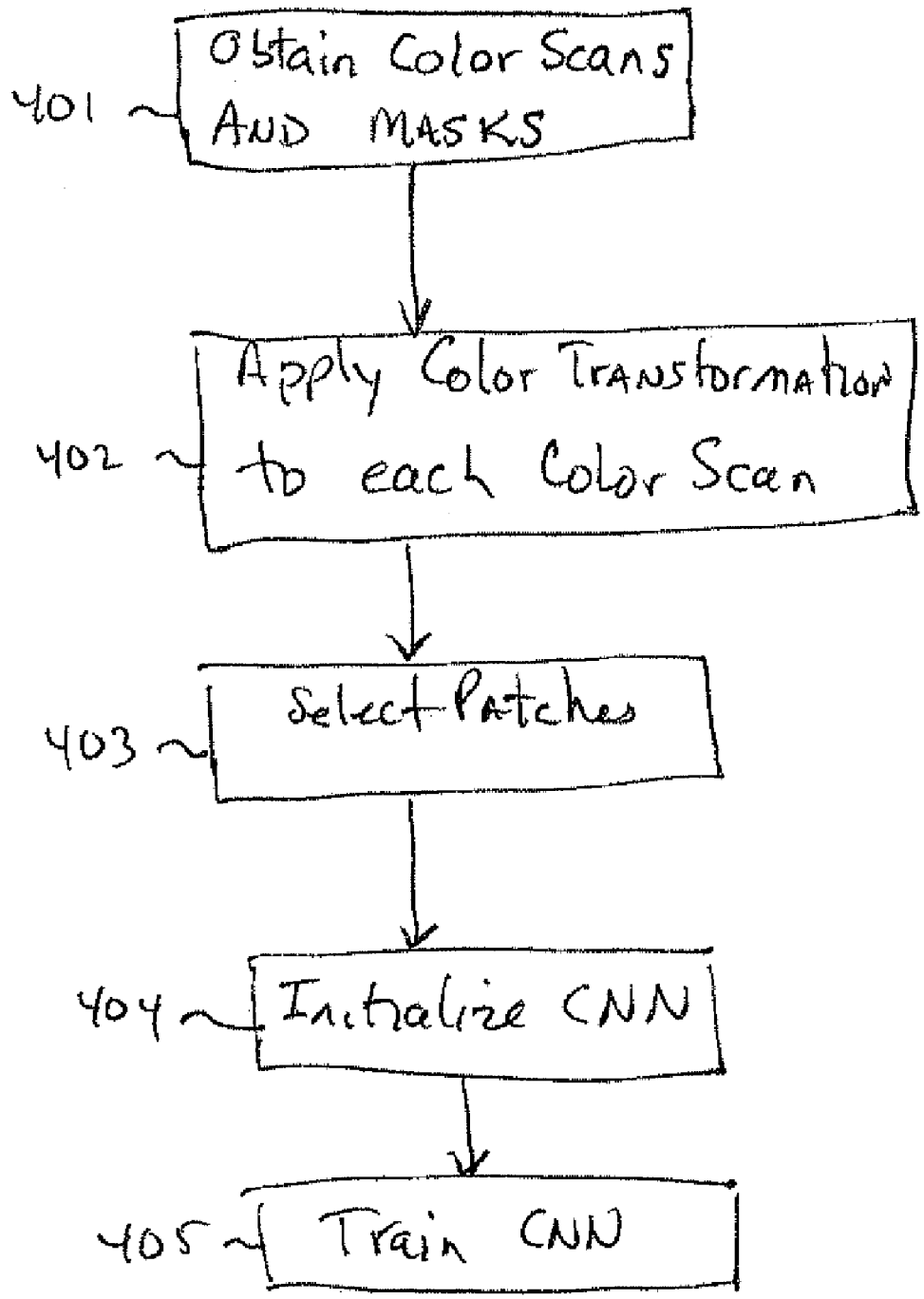
FIG. 4 is a flow chart showing an exemplary embodiment of a method for training the epithelial detector.
Figure 5:
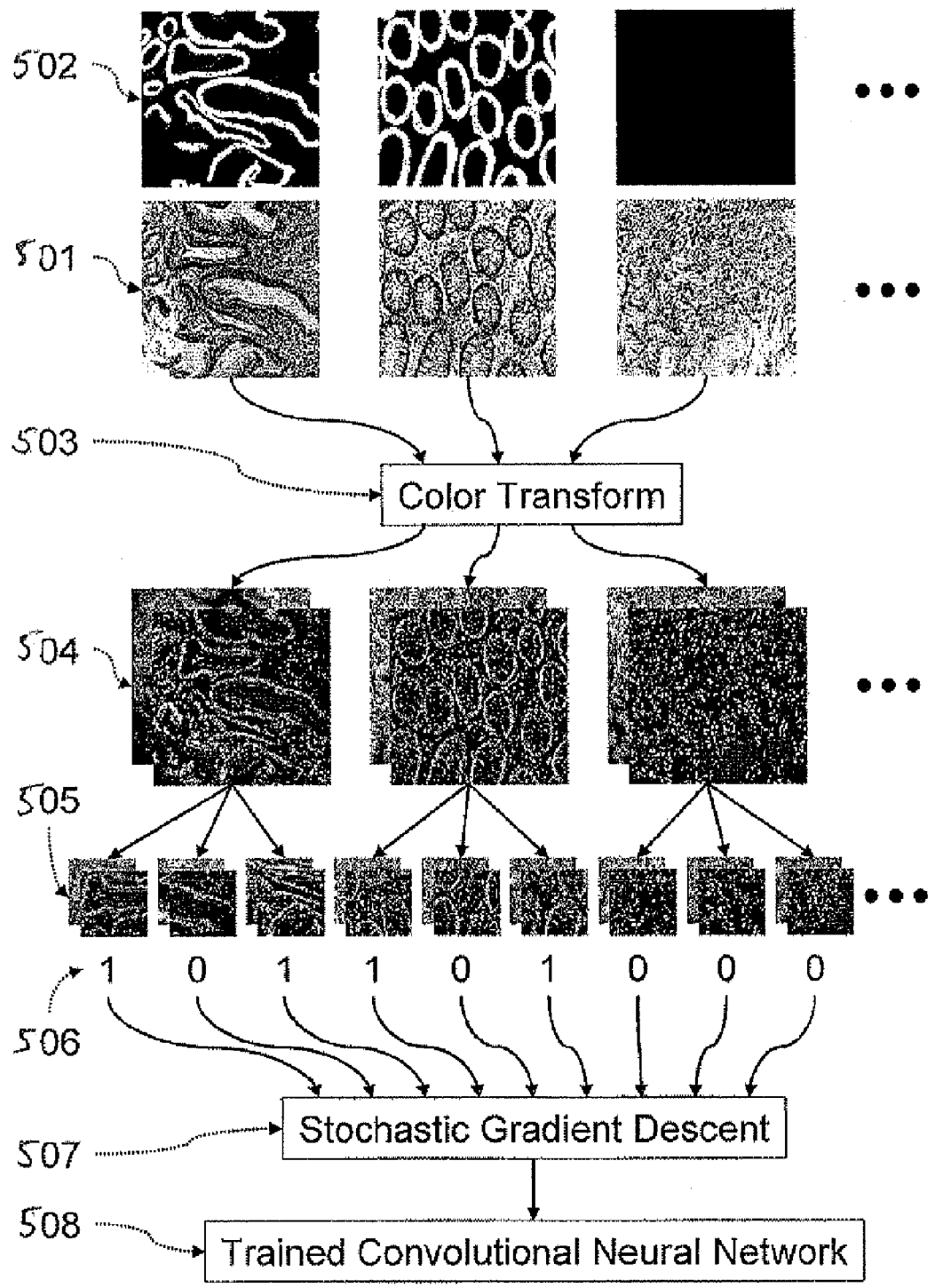
FIG. 5 schematically illustrates the method shown in the flow chart of FIG. 4.

FIGS. 4 and 5 collectively depict an exemplary embodiment of a method for training the epithelial detector to identify epithelial portions of a tissue sample. FIG. 4 is a flow chart of the method and FIG. 5 is a corresponding schematic illustration of the training method. In box 401 (FIG. 4), a corpus of high-resolution color scans 501 (FIG. 5) of tissue samples that have been stained with N dyes are provided along with a corresponding plurality of user created masks (binary images) 502 (FIG. 5), each of which indicates, for each pixel in a corresponding one of the scans, whether that pixel is inside or outside of an epithelial layer. Such masks are well known in the art. The binary information on a mask can encode any boolean property of the underlying pixels. Here, the mask encodes whether or not each position in the image belongs to an epithelial layer. In this embodiment, the tissue samples have been stained with hematoxylin and eosin (so N=2), and the mask for each image is obtained by hand-labeling the image with a data tablet.

In box 402 (FIG. 4), the color transform 102 of the detector 100 (FIG. 1) is applied to each color scan 503 (FIG. 5). This yields N dye channels 504 (FIG. 5) for each color scan.

In box 403 (FIG. 4), patches 505 (FIG. 5) are selected from the dye channels to serve as a training set. Each of the patches 505 corresponds to one input window of the CNN 104 (FIG. 1), and is associated with a label 506 (FIG. 5) that indicates whether the center pixel of the patch is inside or outside of an epithelial layer, according to the mask that corresponds to the image from which the patch came. As shown in FIG. 5, a label of 1 indicates the patch is inside an epithelial layer, and 0 indicates it is not.

In one exemplary embodiment, an equal number of patches that are labeled as being inside and outside epithelial layers, are selected in box 403. The same number of patches are selected from each image, and patches from white areas (i.e. areas where there is no tissue) are not selected. Aside from these constraints, the training patches are selected at random in box 403.

In box 404 (FIG. 4), values of the weights of the CNN 104 are initialized with random values selected from a distribution of floating point numbers. Alternatively, the CNN 104 may be initialized before selecting the patches in box 403. In box 405, the CNN 104 is trained with the patches according to well known principles of stochastic gradient descent and back-propagation 507 (FIG. 5), to produce a trained version 508 (FIG. 5) of the CNN 10, which is capable of identifying epithelial portions of a tissue sample.

One skilled in the art will recognize that the epithelial detector and methods described herein, may be implemented using any suitably adapted computer system. The computer system may include, without limitation, a mainframe computer system, a workstation, a personal computer system, a personal digital assistant (PDA), or other device or apparatus having at least one processor that executes instructions from a memory medium.

The computer system may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof In addition, the memory medium may be entirely or partially located in one or more associated computers or computer systems which connect to the computer system over a network, such as the Internet.

The epithelial detector and methods described herein may also be executed in hardware, a combination of software and hardware, or in other suitable executable implementations. The methods implemented in software may be executed by the processor of the computer system or the processor or processors of the one or more associated computers or computer systems connected to the computer system.

Figure 6:
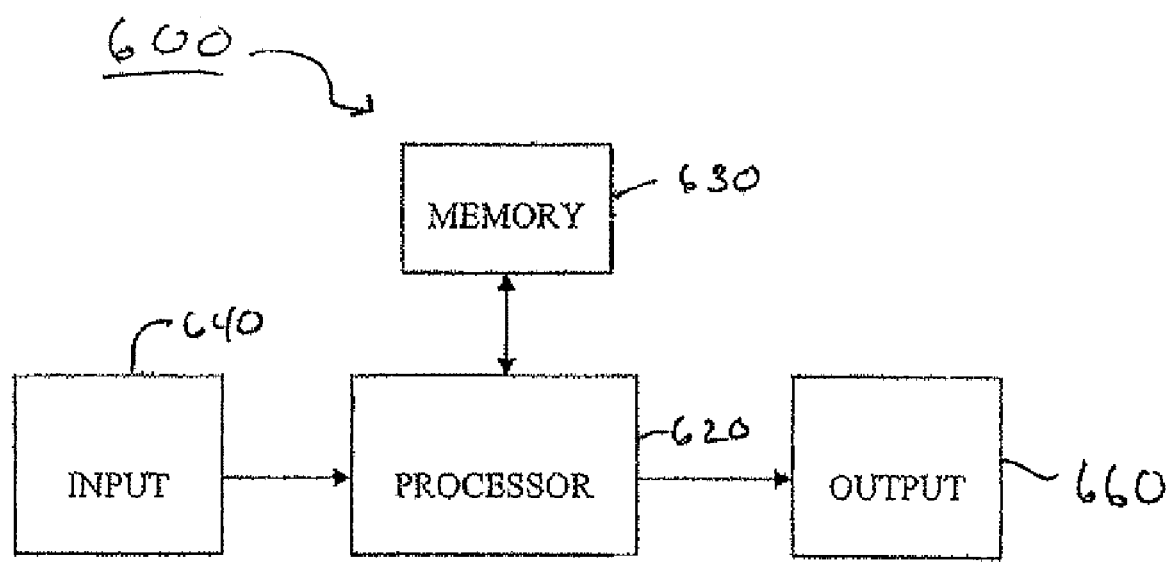
FIG. 6 is a block diagram of an exemplary embodiment of a computer system for implementing the epithelial detector and methods described herein.

FIG. 6 is a block diagram of an exemplary embodiment of a computer system 600 for implementing the epithelial detector and methods described herein. The computer system 600 includes a processor 620, a memory 630 for storing one or more programs which are executable by the processor 620 for implementing the epithelial detector and methods described herein, an input 640 for receiving input data, e.g., unlabeled color scan data and labeled color scan data (training data), and an output 660 for outputting data, e.g., one or more predicted labels indicating that the center of the group is inside an epithelial layer and one or more predicted labels indicating that he center of the group is outside an epithelial layer.

While exemplary drawings and specific embodiments of the present disclosure have been described and illustrated, it is to be understood that that the scope of the invention is not to be limited to the particular embodiments discussed. Thus, the embodiments shall be regarded as illustrative rather than restrictive, and it should be understood that variations may be made in those embodiments by workers skilled in the arts without departing from the scope of the invention as set forth in the claims that follow and their structural and functional equivalents.

What is claimed is:

1. A method for automatically identifying epithelial portions of a tissue sample, the method comprising the steps of:

staining the tissue sample with one or more dyes;

applying a color transformation computer process to separate color images of the dyed tissue sample into one or more color channels; and applying a convolutional neural network computer process to the color channels to obtain a decision for each position in the tissue sample, as to whether it is inside or outside an epithelial layer;

wherein the color channels produced by the color transformation computer process applying step are dye channels;

wherein L1, L2, L3, and L4 are positive integers and wherein the convolutional neural network computer process applying step is performed by:

convolving each of the color channels with a set of L1 trained kernels designated for that channel, adding the results that correspond to the same feature map, adding trained constants to each of the L1 results, and passing the results through a non-linear transfer function, to produce a layer of L1 feature maps;

averaging together groups of adjacent values in each of the L1 feature maps from the first layer to produce averaged adjacent values of the L1 feature maps, multiplying the results by trained constants, adding trained constants to each of the L1 results, and passing the results through a non-linear transfer function, to produce a second layer of L1 feature maps;

convolving those L1 feature maps with a set of L2 trained kernels designated for those feature maps, adding the results that correspond to the same feature map, adding trained constants to each of the L2 results, and passing the results through a non-linear transfer function, to produce a third layer of L2 feature maps;

averaging together groups of adjacent values in each of those L2 feature maps to produce averaged adjacent values of the L2 feature maps, multiplying the results by trained constants, adds trained constants to each of the L2 results, and passing the results through a non-linear transfer function, to produce a fourth layer of L2 feature maps;

convolving those L2 feature maps of the fourth layer with a set of L3 trained kernels designated for those feature maps, adding the results that correspond to the same feature map, adding trained constants to each of the L3 results, and passing the results through a non-linear transfer function, to produce a fifth layer of L3 feature maps;

convolving the L3 feature maps of the fifth layer with a set of L4 trained kernels designated for those feature maps, adding the results that correspond to the same feature map, adding trained constants to each of the L4 results, and passing the results through a non-linear transfer function, to produce a sixth layer of L4 feature maps;

multiplying each of the L4 feature maps of the sixth layer with a first trained weight and adds the results together to produce a first output map;

multiplying each of the L4 feature maps of the sixth layer with a second trained weight and adding the results together to produce a second output map;

comparing the first and second output maps against one another to determine which locations are in the epithelial layers and which are not wherein convolving steps are each performed with a 5 by 5 kernel;

wherein L1 is 9, L2 is 16, L3 is 32, and L4 is 64.

2. The method of claim 1, wherein each of the color images is formed by a plurality of pixels and wherein the color transformation applying step is performed by:
- estimating a dominant color of each dye in the images, to obtain a plurality of dye-color vectors; and
- determining a correlation between each pixel's color and each of the dye-color vectors to obtain the intensity of the corresponding pixel in each of the color images.

3. The method of claim 2, wherein the at least two dyes include hematoxylin and eosin, and the dominant color estimating step is performed by:
- determining a weighted average of all the pixels in each of the color images, the weight of each of the pixels based on its cyan value in a cyan-magenta-yellow color system, to obtain an estimate of a basic cyan component;
- determining a weighted average of all the pixels in each of the color images, with the weight of each of the pixels based on its magnitude after removing the estimated basic cyan component, to obtain an estimate of a basic magenta component;
- removing the estimated basic magenta component from the estimate of basic cyan component to obtain a dye-color vector for hematoxylin, the dye-color vector for hematoxylin being one of the plurality of dye-color vectors; and
- removing the estimated basic cyan component from the estimated basic magenta component to obtain a dye-color vector for eosin, the dye-color vector for eosin being another one of the plurality of dye-color vectors.

4. An epithelial layer detector for automatically identifying epithelial portions of a tissue sample, the detector comprising:
- a color transform unit for applying a color transformation process to separate color images of the dyed tissue sample into one or more color channels; and
- a convolutional neural network unit for applying a convolutional neural network computer process to the color channels to obtain a decision for each position in the tissue sample, as to whether it is inside or outside an epithelial layer;
- wherein the color channels produced by the color transformation process are dye channels;
    - wherein L1, L2, L3, and L4 are positive integers and wherein the convolutional neural network unit performs the convolutional neural network process by:
- convolving each of the color channels with a set of L1 trained kernels designated for that channel, adding the results that correspond to the same feature map, adding trained constants to each of the L1 results, and passing the results through a non-linear transfer function, to produce a layer of L1 feature maps;
- averaging together groups of adjacent values in each of the L1 feature maps from the first layer to produce averaged adjacent values of the L1 feature maps, multiplying the results by trained constants, adding trained constants to each of the L1 results, and passing the results through a non-linear transfer function, to produce a second layer of L1 feature maps;
- convolving those L1 feature maps with a set of L2 trained kernels designated for those feature maps, adding the results that correspond to the same feature map, adding trained constants to each of the L2 results, and passing the results through a non-linear transfer function, to produce a third layer of L2 feature maps;
- averaging together groups of adjacent values in each of those L2 feature maps to produce averaged adjacent values of the L2 feature maps, multiplying the results by trained constants, adding trained constants to each of the L2 results, and passing the results through a non-linear transfer function, to produce a fourth layer of L2 feature maps;
- convolving those L2 feature maps of the fourth layer with a set of L3 trained kernels designated for those feature maps, adding the results that correspond to the same feature map, adding trained constants to each of the L3 results, and passing the results through a non-linear transfer function, to produce a fifth layer of L3 feature maps;
- convolving the L3 feature maps of the fifth layer with a set of L4 trained kernels designated for those feature maps, adding the results that correspond to the same feature map, adding trained constants to each of the L4 results, and passing the results through a non-linear transfer function, to produce a sixth layer of L4 feature maps;
- multiplying each of the L4 feature maps of the sixth layer with a first trained weight and adding the results together to produce a first output map;
- multiplying each of the L4 feature maps of the sixth layer with a second trained weight and adding the results together to produce a second output map;
- comparing the first and second output maps against one another to determine which locations are in the epithelial layers and which are not;
- wherein L1 is 9, L2 is 16, L3 is 32, and L4 is 64.

5. The detector of claim 4, wherein each of the color images is formed by a plurality of pixels and wherein the color transform unit performs the color transformation process by:
- estimating a dominant color of each dye in the image, to obtain a plurality of dye-color vectors; and
- determining a correlation between each pixel's color and each of the dye-color vectors to obtain the intensity of the corresponding pixel in each of the color tissue images.

6. The detector of claim 5, wherein the at least two dyes include hematoxylin and eosin, and the dominant color is estimated by:
- determining a weighted average of all the pixels in each of the color images, the weight of each of the pixels based on its cyan value in a cyan-magenta-yellow color system, to obtain an estimate of a basic cyan component;
- determining a weighted average of all the pixels in each of the color images, with the weight of each of the pixels based on its magnitude after removing the estimated basic cyan component, to obtain an estimate of a basic magenta component;
- removing the estimated basic magenta component from the estimate of basic cyan component to obtain a dye-color vector for hematoxylin, the dye-color vector for hematoxylin being one of the plurality of dye-color vectors; and
- removing the estimated basic cyan component from the estimated basic magenta component to obtain a dye-color vector for eosin, the dye-color vector for eosin being another one of the plurality of dye-color vectors.

7. The detector of claim 4, wherein convolution steps are each performed with a 5 by 5 kernel.

* * * * *